United States Patent Office 3,383,401
Patented May 14, 1968

3,383,401
ALKYL-SUBSTITUTED 1,3-DIOXA-2-BORINANE COMPOUNDS AND PROCESS FOR THEIR PRODUCTION
William G. Woods, Fullerton, and Philip L. Strong, Anaheim, Calif., assignors to United States Borax & Chemical Corporation, Los Angeles, Calif., a corporation of Nevada
No Drawing. Filed Oct. 22, 1965, Ser. No. 502,465
4 Claims. (Cl. 260—462)

This invention relates to cyclic organoboron compounds, and more particularly, it relates to novel alkyl-substituted 1,3-dioxa-2-borinane compounds.

According to the present invention, there are provided compounds of the formula

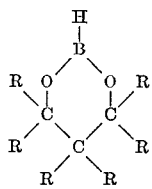

where R is hydrogen or alkyl of from 1 to about 4 carbon atoms and at least one of said R's is alkyl. Thus, each R in the above formula can represent the same or different alkyls or hydrogen, but at least one carbon atom of the ring must have at least one alkyl substituent. Examples of suitable alkyl groups represented by R are methyl, ethyl, propyl, isopropyl and butyl.

The compounds are colorless, high-boiling liquids which are soluble in the usual hydrocarbon and ether solvents. The compounds are surprisingly stable to disproportionation. For example, 4,4,6-trimethyl-1,3-dioxa-2-borinane can be readily distilled at atmospheric pressure and can be stored for long periods of time at room temperature without change. This is in contrast to the unstability of the 5-member ring compound 1,3-dioxa-2-borolane which, as reported by S. H. Rose and S. G. Shore, Inorganic Chemistry 1, 744 (1962), is readily disproportionated, forms a glassy polymer at room temperature, and must be stored at −78° C.

The 1,3-dioxa-2-borinane compounds can be readily prepared by reaction of the corresponding 2-halo-1,3-dioxa-2-borinane compound with sodium borohydride as illustrated by the following equation.

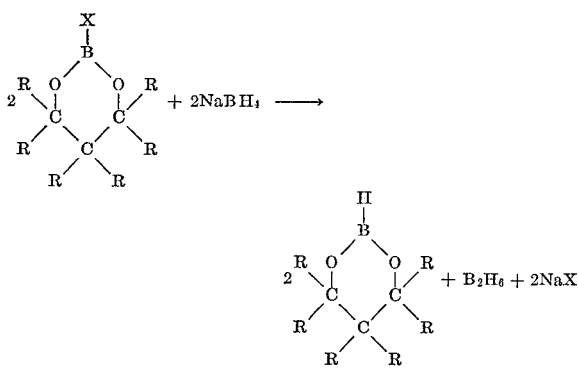

where R has the significance previously assigned and X represents a bromine or chlorine atom.

Preferably, substantially equimolar amounts of the reactants are used so as to obtain best yields of the desired products. The reaction is preferably run at a temperature of from about 0° to 20° C. and an organic solvent such as a glycol ether is employed as a liquid reaction medium so as to maintain efficient control of the reaction temperature and also to facilitate handling of the reactants. The 1,3-dioxa-2-borinane compound is isolated and purified by conventional procedures well known to those skilled in the art. Diborane is obtained as a by-product and can be readily isolated as such or it can be destroyed by absorption in acetone.

Other reducing agents, such as potassium borohydride, lithium aluminum hydride, sodium hydride and sodium trimethoxyborohydride, can be used instead of sodium borohydride.

The intermediate 2-halo-1,3-dioxa-2-borinanes can be prepared by the reaction of the corresponding polyglycol diborate with a halogenating agent such as boron tribromide or boron trichloride as described by Birum and Dever, U.S. Patent No. 3,064,032, issued Nov. 13, 1962.

The following example illustrates the preparation of a representative compound of this invention, but it is to be understood that the invention is not limited to the specific example given.

EXAMPLE 2-chloro - 4,4,6 - trimethyl-1,3-dioxa-2-borinane (1.8 moles) was added over a period of three hours to a mixture of 35.3 grams (0.9 mole) of sodium borohydride in 250 ml. of dry tetraethyleneglycol dimethyl ether at 0°–10° C. The diborane formed was absorbed in an attached trap containing 200 ml. of acetone. The reaction mixture was allowed to warm to room temperature overnight, and then distilled under reduced pressure to yield 119 grams (50%) of 4,4,6-trimethyl-1,3,2-dioxaborinane as a colorless liquid, B.P. 30°–70° C./50 mm. Redistillation gave the purified product at B.P. 55°–56° C./61 mm.; $n_D^{24}$ 1.4031.

Analysis.—Calculated for $C_6H_{13}BO_2$: C, 56.30; H, 10.23; B, 8.45; M.W., 128. Found: C, 56.28; H, 10.43; B, 8.47; M.W., 121

The following are among the many other compounds embraced by the present invention, and may be prepared according to the procedure given above.

4-methyl-1,3-dioxa-2-borinane
5,5-dimethyl-1,3-dioxa-2-borinane
5-butyl-5-ethyl-1,3-dioxa-2-borinane
5-methyl-5-ethyl-1,3-dioxa-2-borinane The present compounds are useful as reducing agents. Salts of metal ions such as silver, copper, tin, and nickel are reduced to the metals, ferric ions are reduced to the ferrous state and arsenic trioxide and pentoxide are reduced to elemental arsenic. This type of reduction can be utilized to prepare hydrogenation catalysts. For example, the finely dispersed nickel formed by reduction of an N,N-dimethylacetamide solution of nickel acetate with 4,4,6-trimethyl-1,3-dioxa-2-borinane is a catalyst for the selective low pressure hydrogenation of phenylacetylene in cyclohexane to give styrene. The solubility of the present compounds in non-polar organic solvents is a distinct advantage in their use as reducing agents. For example, the plating of metals on the surface of organic polymers is facilitated by impregnating the organic substrate with the dioxaborinane compound and treating the surface with a solution of a salt or complex of the metal in an organic solvent, such as benzene.

Various changes and modifications of the invention can be made and, to the extent that such variations incorporate the spirit of this invention, they are intended to be included within the scope of the appended claims.

We claim:
1. A compound of the formula

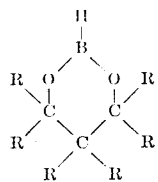

where R is selected from the group consisting of hydrogen and alkyls of from 1 to about 4 carbon atoms, at least one of said R's being alkyl.

2. 4,4,6-trimethyl-1,3-dioxa-2-borinane.

3. The process for producing a compound of the formula

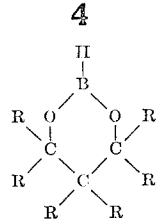

and diborane which comprises reacting sodium borohydride with a compound of the formula

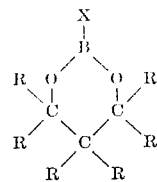

where R is selected from the group consisting of hydrogen and alkyls of from 1 to about 4 carbon atoms, at least one of said R's being alkyl, and X is selected from the group consisting of bromine and chlorine atoms.

4. The process for producing 4,4,6-trimethyl-1,3-dioxa-2-borinane and diborane which comprises reacting 2-chloro-4,4,6-trimethyl-1,3-dioxa-2-borinane with sodium borohydride.

No references cited.

CHARLES B. PARKER, *Primary Examiner.*

L. C. MARUZO, *Assistant Examiner.*